United States Patent
Ralph

(10) Patent No.: US 11,420,276 B2
(45) Date of Patent: Aug. 23, 2022

(54) FILING AND FASTENER DRIVING BIT ASSEMBLY

(71) Applicant: Nigel T. G. Ralph, North York (CA)

(72) Inventor: Nigel T. G. Ralph, North York (CA)

(*) Notice: Subject to any disclaimer, the term of this patent is extended or adjusted under 35 U.S.C. 154(b) by 244 days.

(21) Appl. No.: 16/722,579

(22) Filed: Dec. 20, 2019

(65) Prior Publication Data
US 2021/0187640 A1   Jun. 24, 2021

(51) Int. Cl.
*B23D 71/00*   (2006.01)
*B25B 15/00*   (2006.01)
*B25B 21/00*   (2006.01)

(52) U.S. Cl.
CPC .......... *B23D 71/005* (2013.01); *B25B 15/004* (2013.01); *B25B 21/007* (2013.01)

(58) Field of Classification Search
CPC ...... B23D 71/005; B23D 71/02; B23D 71/04; B23D 71/06; B23D 71/08; B23D 71/10; B23D 71/00; B25B 15/004; B25B 21/007; B25B 15/00; B25B 15/02; B25B 9/00; B25B 21/00; B25G 1/085; B25F 1/00; B08B 9/02; B08B 9/027; B08B 9/043; B08B 9/045; B08B 9/047; B08B 9/049; B08B 9/057; B08B 9/38
See application file for complete search history.

(56) References Cited

U.S. PATENT DOCUMENTS

| | | | |
|---|---|---|---|
| 2,875,651 A * | 3/1959 | Kissinger | B25F 1/00 408/233 |
| D308,623 S | 6/1990 | Nishiki | |
| 5,307,534 A | 5/1994 | Miller | |
| 6,487,947 B1 * | 12/2002 | Clai | B23B 5/168 408/206 |
| 6,704,964 B2 | 3/2004 | Knowles | |
| 6,757,929 B1 * | 7/2004 | Snelson | B08B 9/021 15/104.05 |
| 6,964,077 B2 | 11/2005 | Kadinger | |
| D521,241 S | 5/2006 | Dimmerling | |
| 7,651,303 B2 * | 1/2010 | Zick | B23B 31/1071 7/165 |
| 7,958,587 B1 | 6/2011 | Hansen | |
| 8,101,026 B1 | 1/2012 | Brooks | |
| 2019/0118271 A1 | 4/2019 | Reinbold | |

\* cited by examiner

Primary Examiner — Robert J Scruggs

(57) ABSTRACT

A filing and fastener driving bit assembly for deburring the end of a pipe includes a shaft that has a first end and a second end. A first section of the shaft that is positioned adjacent to the first end is hexagonally shaped. The first section is insertable into a chuck of a rotary tool to couple the shaft to the rotary tool. A second section of the shaft that is positioned between the first section and a second end of the shaft is textured. The second section is used to file an edge of a tubular substrate, such as Electrical Metallic Tubing, as the shaft is rotated by the rotary tool. A screwdriver tip that is coupled to the second end of the shaft is insertable into a complementary head of a fastener, positioning a user to utilize the rotary tool to drive the fastener.

10 Claims, 2 Drawing Sheets

FILING AND FASTENER DRIVING BIT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bit assemblies and more particularly pertains to a new bit assembly for deburring the end of a pipe.

(2) Description of Related Art Including Information Disclosed Under 37 CFR 1.97 and 1.98

The prior art relates to bit assemblies. Prior art devices for deburring pipe ends may comprise metal brushes and cutting bits that are couplable to a rotary tool.

BRIEF SUMMARY OF THE INVENTION

An embodiment of the disclosure meets the needs presented above by generally comprising a shaft that has a first end and a second end. A first section of the shaft that is positioned adjacent to the first end is hexagonally shaped. The first section is configured to be inserted into a chuck of a rotary tool to couple the shaft to the rotary tool. A second section of the shaft that is positioned between the first section and a second end of the shaft is textured. The second section is configured to file an edge of a tubular substrate, such as Electrical Metallic Tubing, as the shaft is rotated by the rotary tool. A screwdriver tip that is coupled to the second end of the shaft is configured be inserted into a complementary head of a fastener, positioning a user to utilize the rotary tool to drive the fastener.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
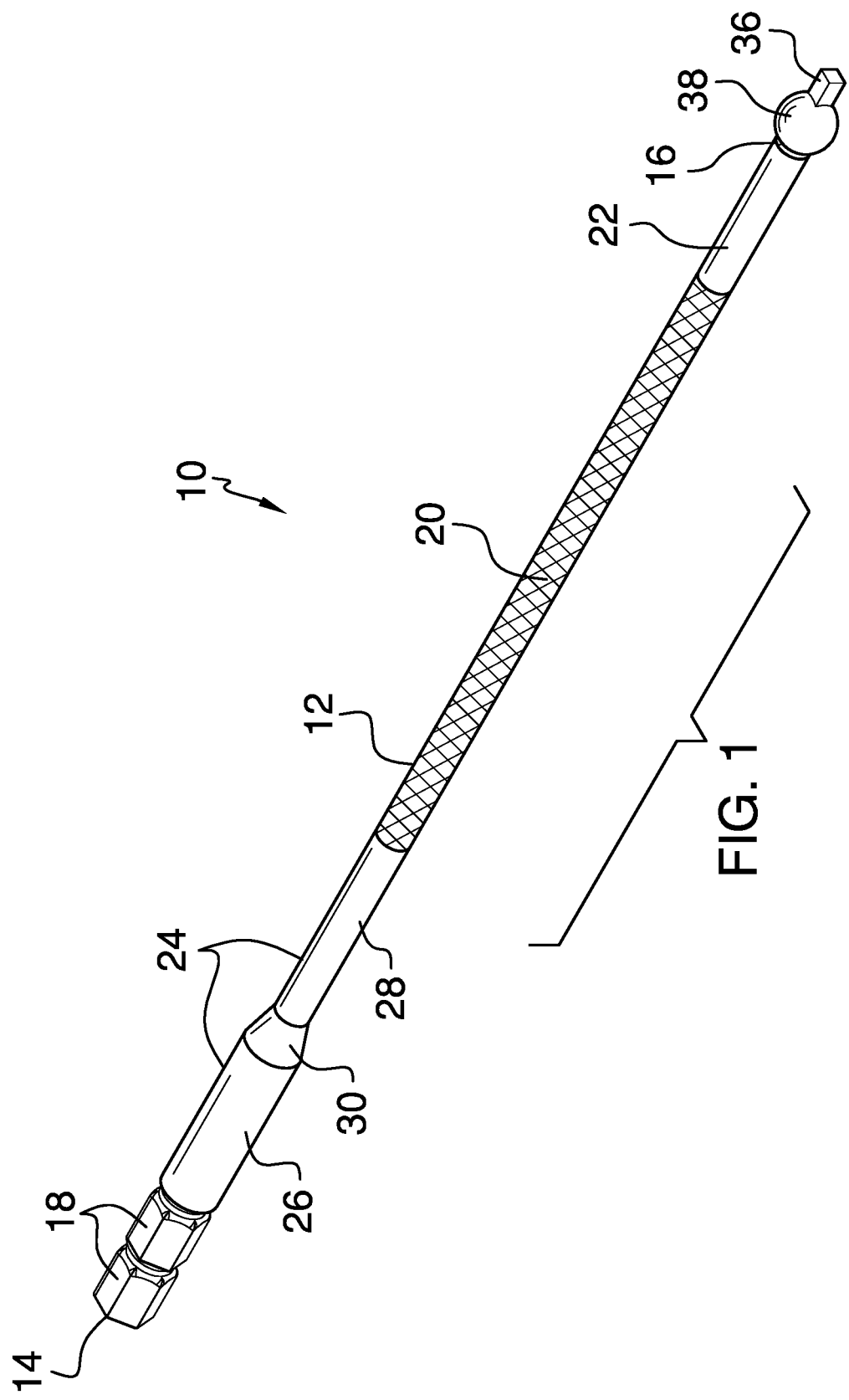
FIG. 1 is an isometric perspective view of a filing and fastener driving bit assembly according to an embodiment of the disclosure.
Figure 2:
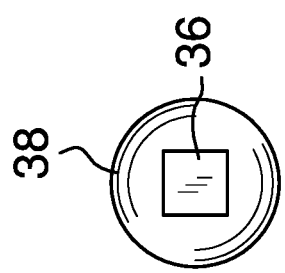
FIG. 2 is an end view of an embodiment of the disclosure.
Figure 3:
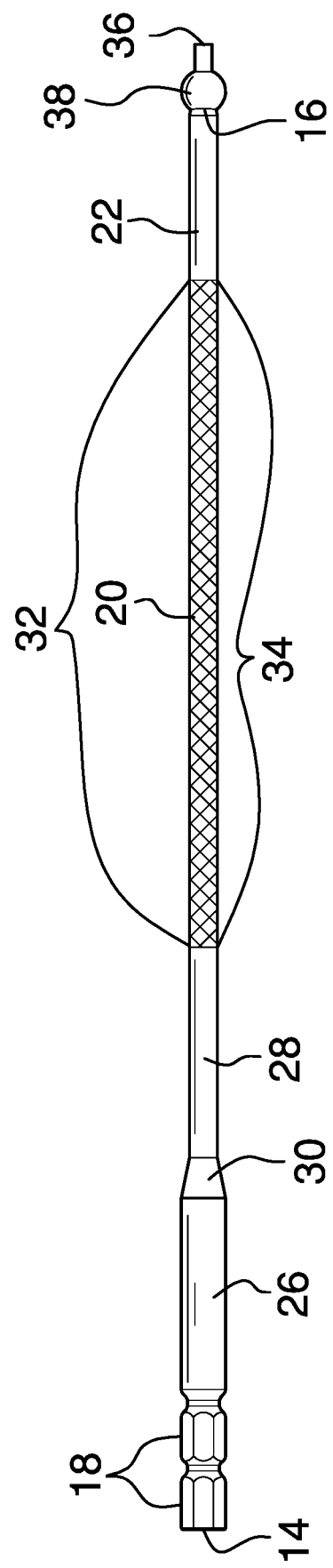
FIG. 3 is a side view of an embodiment of the disclosure.

With reference now to the drawings, and in particular to FIGS. 1 through 3 thereof, a new bit assembly embodying the principles and concepts of an embodiment of the disclosure and generally designated by the reference numeral 10 will be described.

As best illustrated in FIGS. 1 through 3, the filing and fastener driving bit assembly 10 generally comprises a shaft 12 that has a first end 14 and a second end 16. A first section 18 of the shaft 12 that is positioned adjacent to the first end 14 is hexagonally shaped. The first section 18 is configured to be inserted into a chuck of a rotary tool to couple the shaft 12 to the rotary tool, such as a drill. A second section 20 of the shaft 12 that is positioned between the first section 18 and a second end 16 of the shaft 12 is textured. The second section 20 is configured to file an edge of a tubular substrate, such as Electrical Metallic Tubing (EMT), as the shaft 12 is rotated by the rotary tool. Filing the edge of the tubular substrate removes burrs that can damage insulated wiring that is pulled through the EMT and which also can cause injury to a user.

The shaft 12 also comprises a third section 22 and a fourth section 24. The third section 22 is smooth and is positioned between the second section 20 and the second end 16 of the shaft 12. The fourth section 24 also is smooth and is positioned between the second section 20 and the first section 18 of the shaft 12. The fourth section 24 comprises a first segment 26 that extends from the first section 18 and a second segment 28 that extends from the first segment 26 to the second section 20.

A taper 30 is positioned between the first segment 26 and the second segment 28 so that the second segment 28 is circumferentially smaller than the first segment 26. The second segment 28 is substantially circumferentially equivalent to the second section 20 and the third section 22. The first segment 26 has a diametrical measurement of between 3.0 and 6.0 millimeters, while the second segment 28 has a diametrical measurement of between 3.5 and 4.5 millimeters. The first segment 26 may have a diametrical measurement of 4.8 millimeters and the second segment 28 may have a diametrical measurement of 4.0 millimeters.

Each of a pair of recesses 32 extends into the shaft 12 proximate to a respective opposing end 34 of the second section 20 of the shaft 12. The recess 32 extends circumferentially around the shaft 12 and is configured to contact the edge of the tubular substrate as the shaft 12 is drawn across the edge so that the user can feel that the edge is no longer in contact with the second section 20 of the shaft 12.

A screwdriver tip 36 that is coupled to the second end 16 of the shaft 12 is configured be inserted into a complementary head of a fastener, positioning a user to utilize the rotary tool to drive the fastener. The screwdriver tip 36 may be at least one of square type, slot head type, cross-slotted type, and hexagonal type, or other type, such as, but not limited to, pozidriv type, torx drive type, fluted socket type, and the like.

A guard 38 is coupled to and positioned between the screwdriver tip 36 and the second end 16 of the shaft 12. The guard 38 is configured to contact the tubular substrate as the second section 20 of the shaft 12 is rotated against the edge of the tubular substrate to minimize contact of the screwdriver tip 36 with the tubular substrate, thus protecting the screwdriver tip 36 from wear and tear. The guard 38 may be substantially spherically shaped, as shown in FIGS. 1-3, or alternatively shaped, such as, but not limited to, ovally shaped, conical frustum shaped, and the like. The guard 38 is substantially circumferentially equivalent to the first segment 26 of the fourth section 24 of the shaft 12.

In one embodiment, the screwdriver tip 36 is square type and is sized #2. At least one of the guard 38, the third section 22, and the fourth section 24 is colored red so that the at least one of the guard 38, the third section 22, and the fourth section 24 provides a visual indication of the screwdriver tip 36 is sized #2.

In another embodiment, the screwdriver tip 36 is square type and is sized #3. At least one of the guard 38, the third section 22, and the fourth section 24 is colored black so that the at least one of the guard 38, the third section 22, and the fourth section 24 provides a visual indication of the screwdriver tip 36 is sized #2. The present invention also anticipates the screwdriver tip 36 being sized #00, #0, #1, and #4.

In use, the first section 18 of the shaft 12 is inserted into the chuck of the rotary tool to couple the shaft 12 to the rotary tool. The second section 20 is configured to file the edge of the tubular substrate as the shaft 12 is rotated by the rotary tool. Without having to change bits, the user is positioned to use the screwdriver tip 36 to drive the fastener, saving the user time and enhancing efficiency.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A filing and fastener driving bit assembly comprising:
    a shaft having a first end, a first section of the shaft adjacent to the first end being hexagonally shaped wherein the first section is configured for inserting into a chuck of a rotary tool for coupling the shaft to the rotary tool, a second section of the shaft positioned between the first section and a second end of the shaft, the second section of the shaft having a textured surface extending continuously around the shaft wherein the second section is configured for filing an edge of a tubular substrate as the shaft is rotated by the rotary tool, the shaft comprising a third section positioned between the second section and the second end of the shaft, the third section being smooth, the shaft comprising a fourth section positioned between the second section and the first section of the shaft, the fourth section being smooth, the fourth section comprising a first segment extending from the first section and a second segment extending from the first segment to the second section;
    a taper positioned between the first segment and the second segment such that the second segment is circumferentially smaller than the first segment, the second segment being substantially circumferentially equivalent to the second section and the third section; and
    a screwdriver tip coupled to the second end of the shaft wherein the screwdriver tip is configured inserting into a complementary head of a fastener positioning a user for utilizing the rotary tool for driving the fastener.

2. The filing and fastener driving bit assembly of claim 1, wherein:
    the first segment has a diametrical measurement of between 3.0 and 6.0 millimeters; and
    the second segment has a diametrical measurement of between 3.5 and 4.5 millimeters.

3. The filing and fastener driving bit assembly of claim 2, wherein:
    the first segment has a diametrical measurement of 4.8 millimeters; and
    the second segment has a diametrical measurement of 4.0 millimeters.

4. The filing and fastener driving bit assembly of claim 1, wherein the screwdriver tip is at least one of square type, slot head type, cross-slotted type, and hexagonal type.

5. The filing and fastener driving bit assembly of claim 1, further including a guard coupled to and positioned between the screwdriver tip and the second end of the shaft wherein the guard is configured for contacting the tubular substrate as the second section of the shaft is rotated against the edge of the tubular substrate for minimizing contact of the screwdriver tip with the tubular substrate.

6. The filing and fastener driving bit assembly of claim 5, wherein the guard is substantially spherically shaped.

7. The filing and fastener driving bit assembly of claim 6, wherein the guard has a circumference equivalent in size to a circumference of the first segment of the fourth section of the shaft.

8. The filing and fastener driving bit assembly of claim 5, wherein:
    the screwdriver tip is square type; and
    at least one of the guard, the third section, and the fourth section is colored red such that the at least one of the guard, the third section, and the fourth section provides a visual indication of the screwdriver tip being a pre-determined size associated with being colored red.

9. The filing and fastener driving bit assembly of claim 5, wherein the screwdriver tip is square type; and at least one of the guard, the third section, and the fourth section is colored black such that the at least one of the guard, the third section, and the fourth section provides a visual indication of the screwdriver tip being a pre-determined size associated with being colored black.

10. A filing and fastener driving bit assembly comprising:

a shaft having a first end, a first section of the shaft adjacent to the first end being hexagonally shaped wherein the first section is configured for inserting into a chuck of a rotary tool for coupling the shaft to the rotary tool, a second section of the shaft positioned between the first section and a second end of the shaft, the second section of the shaft having a textured surface extending continuously around the shaft wherein the second section is configured for filing an edge of a tubular substrate as the shaft is rotated by the rotary tool, the shaft comprising a third section positioned between the second section and the second end of the shaft, the third section being smooth, the shaft comprising a fourth section positioned between the second section and the first section of the shaft, the fourth section being smooth, the fourth section comprising a first segment extending from the first section and a second segment extending from the first segment to the second section;

a taper positioned between the first segment and the second segment such that the second segment is circumferentially smaller than the first segment, the second segment being substantially circumferentially equivalent to the second section and the third section, the first segment having a diametrical measurement of between 3.0 and 6.0 millimeters, the second segment having a diametrical measurement of between 3.5 and 4.5 millimeters, the first segment having a diametrical measurement of 4.8 millimeters, the second segment having a diametrical measurement of 4.0 millimeters;

a screwdriver tip coupled to the second end of the shaft wherein the screwdriver tip is configured inserting into a complementary head of a fastener positioning a user for utilizing the rotary tool for driving the fastener, the screwdriver tip being at least one of square type, slot head type, cross-slotted type, and hexagonal type, the screwdriver tip being square type; and a guard coupled to and positioned between the screwdriver tip and the second end of the shaft wherein the guard is configured for contacting the tubular substrate as the second section of the shaft is rotated against the edge of the tubular substrate for minimizing contact of the screwdriver tip with the tubular substrate, the guard being substantially spherically shaped, the guard has a circumference equivalent in size to a circumference of the first segment of the fourth section of the shaft, at least one of the guard, the third section, and the fourth section being colored red such that the at least one of the guard, the third section, and the fourth section provides a visual indication of the screwdriver tip being a pre-determined size associated with being colored red.

\* \* \* \* \*